United States Patent [19]
Watanabe

[11] Patent Number: 4,601,136
[45] Date of Patent: Jul. 22, 1986

[54] SEMICIRCULAR ARCHING ROOF TYPE PIPE-FRAME GREENHOUSE WITH MONITOR ROOF-LIKE PROTRUSION

[75] Inventor: Jusuke Watanabe, Tokyo, Japan

[73] Assignee: Watanabe Pipe Co., Ltd., Tokyo, Japan

[21] Appl. No.: 501,137

[22] Filed: Jun. 6, 1983

[30] Foreign Application Priority Data

Jul. 21, 1982 [JP] Japan ............................ 57-110782[U]

[51] Int. Cl.⁴ .......................... A01G 9/24; E04B 1/34
[52] U.S. Cl. ......................................... 52/63; 52/86; 47/17; 47/28 R; 135/93
[58] Field of Search ..................... 52/63, 86, 302, 303; 47/17, 28; 135/93, 102, 101

[56] References Cited

U.S. PATENT DOCUMENTS

| | | | |
|---|---|---|---|
| 1,856,658 | 5/1932 | Rummler | 135/93 |
| 2,852,109 | 9/1958 | Pine | 52/303 X |
| 3,812,616 | 5/1974 | Koziol | 47/17 |
| 4,399,738 | 8/1983 | Sharkey | 47/17 X |

FOREIGN PATENT DOCUMENTS

| | | | |
|---|---|---|---|
| 2837591 | 3/1980 | Fed. Rep. of Germany | 47/17 |
| 1400547 | 4/1965 | France | 47/17 |
| 6966 | of 1898 | United Kingdom | 47/17 |
| 2077084 | 12/1981 | United Kingdom | 47/17 |

OTHER PUBLICATIONS

*Horticulture*, "Glass or Plastic in Greenhouse Construction", M. Jamieson, 7/1976, pp. 285–287.
*Popular Science*, "Greenhouses", Terry L. Patton, Mar. 1980, p. 116.

Primary Examiner—John E. Murtagh
Assistant Examiner—Richard Chilcot
Attorney, Agent, or Firm—Hopgood, Calimafde, Kalil, Blaustein & Judlowe

[57] ABSTRACT

The inventive Quonset-type pipe-frame greenhouse is constructed with: a plurality of main rib members each in a semicircular or inverted U-shaped form erected on the ground in parallel with each other and connected together with at least one longitudinal connecting member to form a main room; a plurality of auxiliary rib members each straddling on the ridge line of the main room and connected together with at least one auxiliary longitudinal connecting member to form a monitor roof-like protrusion; and transparent sheet members of a plastic resin for the walls of the main room and the monitor roof-like protrusion each capable of being turned up at the lower end to make an opening for ventilation according to need. The inventive greenhouse is advantageous in the improved ventilation in the upper part of the room to assist healthy growth of the plants and in the improved aerodynamic strength of the structure capable of resisting a strong wind without the danger of falling down.

7 Claims, 6 Drawing Figures

SEMICIRCULAR ARCHING ROOF TYPE PIPE-FRAME GREENHOUSE WITH MONITOR ROOF-LIKE PROTRUSION

BACKGROUND OF THE INVENTION

The present invention relates to a novel Quonset-type (semicircular arching roof type) pipe-frame greenhouse for horticulture, i.e. cultivation of fruits, flowers, vegetables and the like plants.

There is known a Quonset-type greenhouse in the prior art constructed with a plurality of pipe-frame rib members of each a semicircular or inverted U-shaped form erected upright on the ground in parallel with each other and connected together with at least one longitudinal connecting member to form a skeletal framework and provided with walls made, in place of traditional glass panes, of a transparent or translucent plastic film or sheet to admit entrance of sunlight on to the plants under growing.

The advantage obtained with such a sheet-walled pipe-frame Quonset-type greenhouse is that, in addition to the relative simpleness in the structure and hence low costs for construction in comparison with traditional glass-paned greenhouses, a convenient way is provided for the ventilation between inside and outside of the greenhouse at least in the vicinity of the ground by merely turning up or rolling up the lower end portion of the sheet wall in order to promote healthy growth of the plants under cultivation.

The problem in the greenhouses of the above described type is that, while sufficient ventilation can be obtained when the growing plants are still small, i.e. when the ventilation in the vicinity of the ground is essential or sufficient, no satisfactory ventilation is obtained in the upper portion of the greenhouse so that healthy growth of the plants is greatly disturbed when the plants have grown to have tallness approximating the roof of the greenhouse and the plants may sometimes become rotten or moldered in the top portions thereof.

As a remedy for the above problem, there has been proposed a greenhouse having a top opening capable of being opened and closed according to need. Such a greenhouse provided with a top opening is, however, not quite satisfactory because the top opening must be closed in a stormy weather or in a heavy rain in order to keep the atmosphere in the greenhouse not overly humid.

SUMMARY OF THE INVENTION

It is therefore an object of the present invention to provide a novel and improved Quonset-type pipe-frame greenhouse with sheet walls free from the above described problem of poor ventilation and good ventilation can be obtained therein conveniently regardless of the climatic conditions.

The Quonset-type pipe-frame greenhouse of the present invention comprises:

(a) a plurality of main pipe-frame rib members of each a semicircular or inverted U-shaped form erected upright on the ground in parallel with each other, (b) at least one main longitudinal connecting member connecting the main pipe-frame rib members together to form a skelton of a main room of the greenhouse, (c) a main sheet member for the walls of the main room made of a transparent or translucent film or sheet of a plastic resin and attached to the skelton of the main room in such a manner that at least a part thereof is capable of being opened and closed according to need, (d) a plurality of auxiliary pipe-frame rib members of each, typically, a semicircular or inverted U-shaped form smaller than the main pipe-frame rib member and each straddling on the top portion of the main pipe-frame rib member in parallel with each other, (e) at least one auxiliary longitudinal connecting member running in parallel with the main longitudinal connecting member and connecting the auxiliary pipe-frame rib members together to form a skelton for a monitor roof-like protrusion or clerestory on the ridge of the main room, and (f) an auxiliary sheet member for the walls of the monitor roof made of a transparent or translucent film or sheet of a plastic resin and attached to the skelton of the monitor roof-like protrusion in such a manner that at least a part thereof is capable of being opened and closed according to need.

DETAILED DESCRIPTION OF THE PREFERRED EMBODIMENTS

Figure 1:
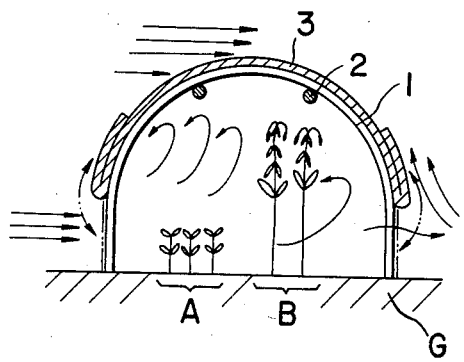
FIG. 1 is a cross sectional view of a conventional Quonset-type pipe-frame greenhouse.

As is mentioned above, there is known a pipe-frame sheet-walled Quonset-type greenhouse constructed with a skeletal framework formed of a plurality of main pipe-frame rib members of each a semicircular or inverted U-shaped form and erected upright on the ground in parallel with each other and at least one longitudinal member connecting the rib members together. FIG. 1 illustrates a cross sectional view of a typical greenhouse of such a type, in which a plurality of the inverted U-shaped pipe-frame rib members 1 are erected upright on the ground G in parallel with each other and connected together with at least one longitudinal member 2 to form a skeletal framework of the Quonset-type greenhouse. The walls of the greenhouse are conveniently made of a transparent or translucent sheet member 3 of a plastic resin which is attached to the skelton of pipe frames.

The sheet member 3 is attached to the pipe-frame skelton usually in such a manner that at least the lower end portion thereof can be turned up or rolled up as is shown in FIG. 1 in order to make an opening for ventilation according to need. In some cases, windows and/or top openings like a skylight are provided in addition. The arrows in FIG. 1 show the air stream outside and inside of the greenhouse when the lower ends of the sheet walls 3 are turned up.

A problem in respect of ventilation in such a greenhouse is that, although healthy growths of the plants is ensured or not disturbed due to the poor ventilation at least when the plants are still small as is shown by A in FIG. 1, the growing plants are sometimes subjected to a danger of moldering at the top portions when they have grown to reach the upper portion or roof of the greenhouse as is shown by B in the figure because the upper portion inside the greenhouse is so stuffy due to the poor ventilation in that space. This problem is more serious when the top openings cannot be opened in a strong wind or stormy weather so that the ventilation inside the greenhouse is limited to the vicinity of the ground G.

Another problem in the above described conventional Quonset-type pipe-frame greenhouse is in the poor aerodynamic strength of the structure leading to occasional falling down of the greenhouse in a relatively strong wind, especially, when the lower end portions of the sheet walls 3 are turned up to cause a strong floating power due to the ascending air stream. When the greenhouse is in a strong wind even with the sheet walls 3 closed, furthermore, the greenhouse is subject to danger of falling down as a result of the negative pressure, i.e. lower pressure than inside the greenhouse, to give a floating power at the side opposite to the side confronting the wind in a laminar flow. It is generally understood that such a greenhouse with closed sheet walls 3 falls down in a strong wind mainly due to the above mentioned negative pressure with a floating power rather than the direct wind pressure in a downward or horizontal direction. The danger of falling down is particularly large in these Quonset-type pipe-frame greenhouses because such a structural body is usually built without sufficient foundation works on a relatively soft ground G.

Figure 2:
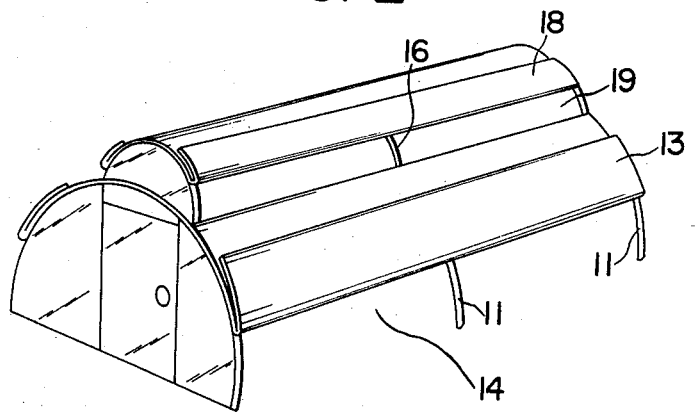
FIGS. 2 and 3 are each a perspective view and a cross sectional view, respectively, of a typical embodiment of the inventive Quonset-type pipe-frame greenhouse.
Figure 3:
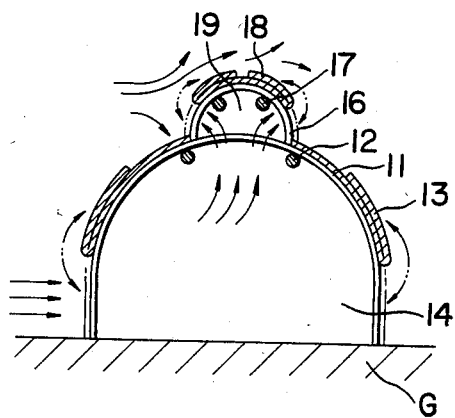

FIGS. 2 and 3 illustrate a perspective view and a cross sectional view, respectively, of a typical embodiment of the inventive Quonset-type pipe-frame greenhouse in which the above described problems in the prior art greenhouses, i.e. the stuffiness of the inside atmosphere in the upper portion and the weakness in structure against falling down in a wind, can be solved conveniently. The above objects are well achieved in the present invention by providing a monitor roof-like protrusion on the ridge of the main room extending in the longitudinal direction, and the sheet walls on the main room and the protrusion are capable of being opening independently.

The skeletal framework of the main room 14 of the inventive greenhouse illustrated in these figures is formed of a plurality of main pipe-frame rib members 11 (there are three in FIG. 2) each in a semicircular or inverted U-shaped form erected upright on the ground G in parallel with each other, for example, by embedding the free ends in the soil and at least one longitudinal connecting member 12 (there are two in FIG. 3) connecting the rib members 11 together. This skeletal framework is covered with transparent or translucent sheets 13 of a plastic resin to form the walls of the main room 14. The lower end portion of each of the side walls 13 made of a plastic sheet is not fixedly attached to the framework so that the portion can be turned up or rolled up according to need as is shown in FIG. 2 to provide side openings for ventilation in the vicinity of the ground. In the inventive greenhouse, at least a part of the top portion of the skeletal framework formed of the main rib members 11 and the main connecting members 12 is not covered by the sheet member 13 to leave a top opening or top openings.

In addition to the above described framework, there are provided a plurality of auxiliary pipe-frame rib members 16 (there are three in FIG. 2) each in a semicircular or inverted U-shaped form smaller than the main rib member 11 and straddling the ridge of the main room 14 at the portion where the top opening is provided on the roof of the main room 14 in parallel with each other and connected together with at least one (there are two in FIG. 3) auxiliary longitudinal connecting member 17 running in parallel with the main longitudinal connecting member 12 to form a skelton of a monitor roof-like protrusion.

In FIG. 2, each of the auxiliary rib members 16 is connected at the free ends thereof to the upper part of one of the main rib members 11 although it is optional that one or more of the auxiliary rib members 16 are connected at the two free ends thereof to two of the main longitudinal connecting members 12 by use of suitable pipe joints.

The thus formed auxiliary skelton for the monitor roof is also covered with an auxiliary sheet member 18 made of a transparent or translucent plastic resin film or sheet and attached to the skeletal framework to form the walls of an auxiliary room 19 under the monitor roof. Similarly to the sheet walls 13 of the main room 14, at least a part, usually the lower end portion, of these sheet walls 18 on the auxiliary room 19 under the monitor roof are also capable of being turned up or rolled up as is shown in FIG. 2 to provide upper openings for ventilation. Although the auxiliary room 19 in FIG. 2 extends over the whole length of the main room 14, it is optional that the former is shorter than the latter if sufficient effect of ventilation is obtained with such a shorter monitor roof.

FIG. 3 illustrates the air stream by the arrows outside and inside the greenhouse when both of the side openings and the upper openings are open. There is always an ascending air flow in the main room 14 and the air reaching the top opening of the main room 14 is efficiently transferred into and discharged through the upper openings in the auxiliary room 19 formed by turning up the sheet walls 18 by the effect of suction even in a gentle wind. This phenomenon is something like the so-called stack effect since the ascending warmed air in the main room 14 is preferentially collected in the auxiliary room 19 to be first discharged into the open air so that stuffiness in the inside atmosphere of the greenhouse can be effectively prevented without affecting the healthy growth of the plants under cultivation.

Figure 6:
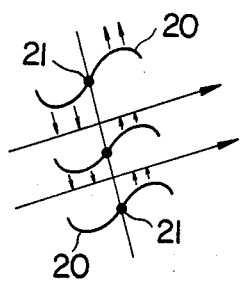
FIG. 6 is a cross sectional view of a Venetian blind-type shutter for providing ventilation.

As a means for providing openings on the sheet walls 18 of the monitor roof, there may be provided one or more of shutters of a Venetian (slatted) blind-type or other suitable types on the walls of the monitor roof where an opening is formed in the sheet wall 18 instead of directly turning up or rolling up the lower end portion of the sheet wall 18 on the auxiliary room 19. FIG. 6 is a schematic illustration of such a Venetian blind-type shutter, of which each vane 20 has an S-shaped cross section revolvable around the pivotal shaft 21 in order to further improve the efficiency of ventilation when the vanes 20 are turned open by the ascending air stream from inside the greenhouse even in a very gentle wind.

When the inventive greenhouse is blown by a strong wind with the side openings of the main room 14 and the upper openings of the auxiliary room 19 being open, the wind coming into the main room 14 at the side openings blows through the room to ascend into the upper auxiliary room 19 under the monitor roof from which the air stream flows out through the upper openings so that little floating power is exerted to the greenhouse resulting in safety from the danger of falling down by the wind. Further, when the side openings of the main room 14 and the upper openings of the auxiliary room 19 are closed in such a strong wind, the air stream of the wind in a laminar flow is disturbed into a turbulent flow by virtue of the monitor roof protruded on the ridge of the main room 14 so that the negative pressure in the downstream side of the greenhouse is greatly reduced and falling down of the greenhouse is effectively prevented.

Figure 4:
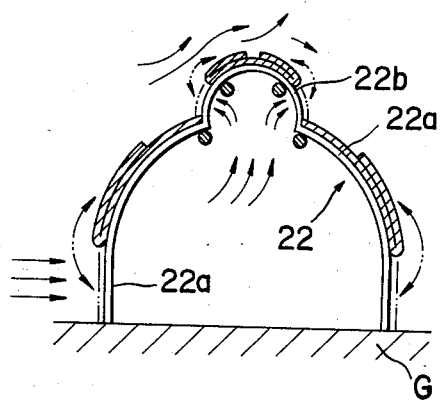
FIGS. 4 and 5 are each a cross sectional view of different modifications of the inventive pipe-frame greenhouse.
Figure 5:
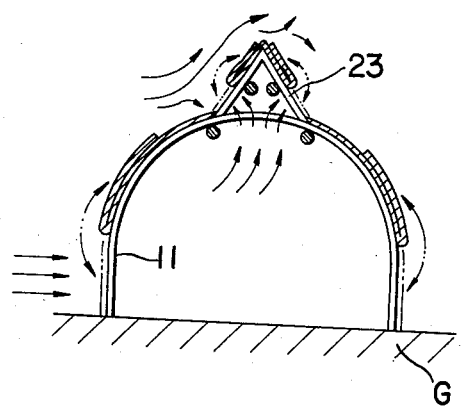

In the embodiment illustrated in FIGS. 2 and 3, the main rib members 11 and the auxiliary rib members 16 are separately formed and joined together by use of suitable pipe joints. It is of course optional that they are formed in an integral rib member 22 as is shown in FIG. 4 and each of the rib members is composed of the two arch-wise portions 22a connected with the semicircular or inverted U-shaped portion 22b. Further, the cross section of the monitor roof or the form of the auxiliary rib member 16 is not limited to a semicircular or inverted U-shaped form but may be in any desired form such as an inverted V-shape 23 so that the auxiliary room 19 has a peaked roof as is shown in FIG. 5. With such a peaked form of the monitor roof, the above mentioned stack effect is strengthened with a larger temperature gradient in the auxiliary room 19 as the height of the peaked roof is higher.

As is described in the above, the pipe-frame greenhouse of the invention is provided with upper openings capable of being opened or closed conveniently according to need with the protruded auxiliary room 19 running in parallel with the main room 14 along the ridge thereof. Therefore, great advantages are obtained not only by the improved ventilation inside the greenhouse contributing to the healthy growth of the plants under cultivation but also by the reduced danger of falling down of the greenhouse even in a stormy weather.

What is claimed is:

1. A semicircular arching roof-type pipe-frame greenhouse which comprises:
   (a) a plurality of main pipe-frame rib members of each a semicircular or inverted U-shaped form erected upright on the ground in parallel with each other,
   (b) at least one main longitudinal connecting member connecting the main pipe-frame rib members together to form a skelton of a main room of the greenhouse,
   (c) a main sheet member for the walls of the main room made of a transparent or translucent film or sheet of a plastic resin and attached to the skeleton of the main room in such a manner that at least a part thereof longitudinally of the greenhouse is capable of being opened and closed according to need,
   (d) a plurality of auxiliary pipe-frame rib members each, surmounted on the top portion of a respective main pipe-frame rib member extending upwardly in parallel with each other,
   (e) at least on auxiliary longitudinal connecting member running in parallel with the main longitudinal connecting member and connecting the auxiliary pipe-frame rib members together to form a skeleton for a monitor roof-like protrusion or clerestory on the ridge of the main room, and
   (f) an auxiliary sheet member for the walls of the monitor roof made of a transparent or translucent film or sheet of a plastic resin and attached to the skeleton of the monitor roof in such a manner that at least one opening is provided therein longitudinally of the greenhouse capable of being opened and closed according to need.

2. The pipe-frame greenhouse as claimed in claim 1 wherein each of the auxiliary pipe-frame rib members has a semicircular or inverted U-shaped form.

3. The pipe-frame greenhouse as claimed in claim 1 wherein each of the auxiliary pipe-frame rib members has an inverted V-shaped form.

4. The pipe-frame greenhouse as claimed in claim 1 wherein the skelton of the monitor roof extends over substantially whole length of the ridge of the main room.

5. The pipe-frame greenhouse as claimed in claim 1 wherein the opening in the auxiliary sheet member is formed by turning or rolling up the lower longitudinal end portion of the sheet member.

6. The pipe-frame greenhouse as claimed in claim 1 wherein the opening in the auxiliary sheet member is provided with at least one slotted blind-type shutter capable of being opened or closed according to need.

7. The pipe-frame greenhouse as claimed in claim 1 wherein each of the auxiliary pipe-frame rib members is integrally formed with one of the main pipe-frame rib members.

* * * * *